Inventors,
Henry M. Stahr,
Richard Graham,
by Sidney Greenberg
Their Attorney.

United States Patent Office 3,242,402
Patented Mar. 22, 1966

3,242,402
ELECTRICAL CAPACITOR AND DIELECTRIC
MATERIAL THEREFOR
Henry M. Stahr, Columbia, S.C., and Richard Graham, Rochester, N.H., assignors to General Electric Company, a corporation of New York
Filed Dec. 31, 1963, Ser. No. 334,749
7 Claims. (Cl. 317—259)

This application is a continuation-in-part of copending application Serial No. 223,691, filed September 14, 1962, now abandoned and assigned to the same assignee as the present application.

The present invention relates to electrical capacitors, and more particularly to an improved dielectric liquid for electrical capacitors.

Halogenated aromatic compounds, known as askarels in the industry, and specifically chlorinated diphenyl and related compounds, have been extensively used in the past as dielectric media in electrical apparatus such as electrical capacitors for cooling and insulating purposes, these compounds having the advantage over mineral oil dielectrics of being non-flammable and having higher dielectric constants. A difficulty which arises in the use of chlorinated aromatic compounds as dielectric media, however, is that electrical discharges or stress in the apparatus, or chemical hydrolytic attack, may cause decomposition products of the chlorinated compound to form, particularly hydrogen chloride, which adversely affect the properties of the dielectric and lead to degradation of the dielectric liquid and other insulating components in the apparatus and result in shortened life for capacitors. To overcome this problem, so-called scavenger or getter materials have been incorporated in the capacitor dielectric liquid for removing or neutralizing the effect of the hydrogen chloride and other decomposition products. However, the known scavenger materials heretofore employed for this purpose have had various drawbacks such as reacting too slowly with the decomposition products, or adversely affecting the properties of the dielectric liquid, especially in terms of increasing power factor at elevated temperatures in the operation of the capacitors in which the dielectric liquid is incorporated, and thereby also contributing to unduly limited life of the capacitors.

It is an object of the invention to provide an improved electrical capacitor incorporating a novel dielectric composition of halogen aromatic type which avoids the above mentioned disadvantages of prior types of electrical capacitors.

It is a particular object of the invention to provide electrical capacitors incorporating a halogen aromatic dielectric liquid having an improved scavenger material therein which provides improved electrical properties, and particularly power factor characteristics, under high temperature conditions and over a prolonged period, and thereby improves the life characteristics of the capacitor.

It is still another object of the invention to provide an improved dielectric composition of the above type including a novel scavenger material for the above purposes which has superior speed of reaction with the harmful decomposition products, is easily handled, and is relatively low in cost.

Other objects and advantages will become apparent from the following description and the appended claims.

With the above objects in view, the present invention relates in a preferred embodiment to an electrical capacitor comprising cooperating armatures and a dielectric liquid interposed between the armatures comprising a chlorinated diphenyl compound containing dissolved therein an epoxide scavenger comprising 1-epoxyethyl-3,4-epoxycyclohexane.

The invention will be better understood from the following description taken in conjunction with the accompanying drawing, in which.

Figure 1:
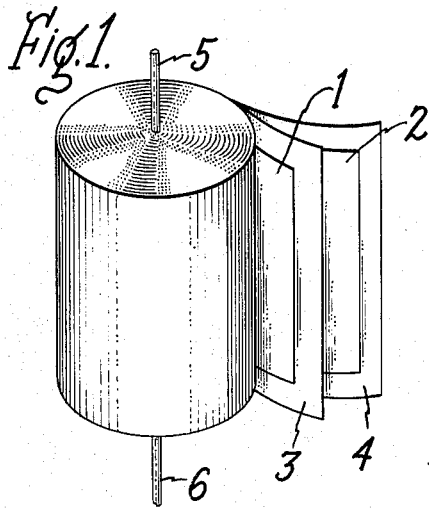
FIGURE 1 illustrates an electrical capacitor to which the present invention is applicable.

Referring now to the drawing, and particularly to FIGURE 1, there is shown a rolled type capacitor comprising a pair of convolutely wound electrode foils 1 and 2 of suitable metal, e.g., aluminum, insulated from each other by separate sheets 3 and 4 of suitable dielectric material such as kraft paper, or other porous impregnatable dielectric material. The electrical contact to electrode foils 1 and 2 is made by terminal leads 5, 6 of electrically conducting material which are applied to the respective foil electrodes and project from opposite ends of the wound capacitor section.

Figure 2:
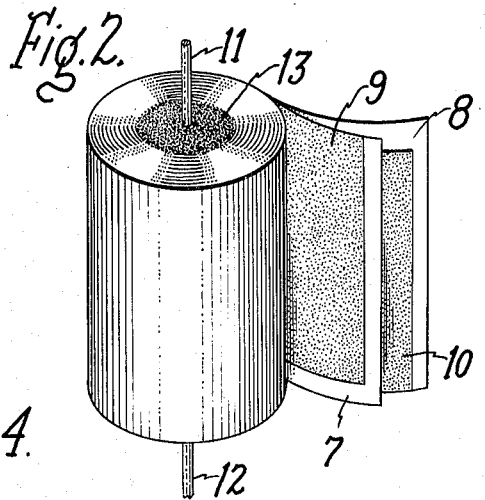
FIGURE 2 illustrates a different embodiment of electrical capacitor to which the present invention may be applied.

In the different form of capacitor as shown in FIGURE 2, and in which the invention provides particularly notable advantages, the wound capacitor section comprises a pair of convolutely wound dielectric films 7, 8 of suitable insulating material such as cellulosic paper, plastic films, and the like, films 7, 8 having metallized coatings 9, 10 respectively thereon serving as the capacitor electrodes. The metallized electrode coatings may be composed of aluminum or any other suitable conducting material such as tin, silver, copper, lead, zinc, or non-metallic solid conductive material such as carbon, and may be applied by any metallizing or other suitable depositing techniques. A satisfactory metal coating may be produced, for example, by vacuum evaporation of the desired metal, or by sputtering, dipping, painting, chemical deposition, or the like. As shown, the margins of the opposite edges and the ends of dielectric films 7, 8 are left free of metal coating to avoid the risk of short-circuiting between the electrodes of opposite polarity. Terminals 11, 12 are electrically connected to the metallized coating edges exposed at opposite ends of the roll by a metal connection 13 produced by scooping, soldering, or other suitable process, as well known in the art.

As applied to capacitors of the metallized electrode type as shown in FIGURE 2, the invention is advantageous in making it practical to use metallized electrodes with their attendant benefits of self-clearing properties in combination with dielectric liquids of halogenated aromatic composition. The self-clearing effect is caused by momentary current increases taking place in the locality of defects of the dielectric spacer material which causes the metal electrode layer to burn away in that locality and restore the dielectric strength in that region. However, in the absence of an effective scavenging material such as that of the present invention, halogen-containing degradation products are generated when the electrode clearing occurs, such products being injurious to the thin electrode layer as well as to the dielectric liquid and the dielectric spacer material, and other components of the capacitor. By use of the present invention, there is thus made possible the use of metallized electrode capacitors which have small relative volume and the benefits of self-clearing, as described.

Figure 3:
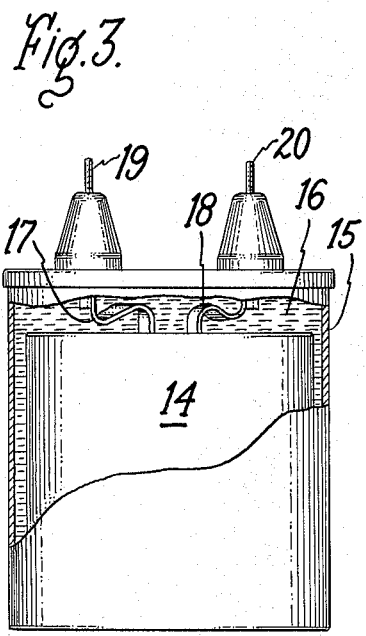
FIGURE 3 illustrates an encased capacitor unit in which the invention may be embodied.

FIGURE 3 shows a capacitor assembly in which a wound capacitor section 14, such as the wound sections shown in FIGURES 1 and 2, is enclosed in a casing 15 containing a dielectric liquid 16 impregnating the roll capacitor section. Dielectric liquid 16 is of halogenated aromatic composition and has a scavenger material incorporated therein of a composition that is more fully described below. Tap straps 17, 18 connected within the capacitor section to electrodes of different polarity are respectively connected to external terminals 19, 20 suitably mounted on the cover of the casing.

During operation of the capacitor, decomposition of the aromatic dielectric liquid contained therein may occur when the dielectric liquid is subjected for long periods to voltage stress or to elevated temperatures, or to the action of reactive chemical agents. Such decomposition produces the formation of halogen compounds as mentioned above, which are particularly deleterious to the cellulosic paper used in the capacitor, and to the dielectric liquid itself, and leads to premature breakdown and failure of the electrical capacitor.

In accordance with the invention, halogened aromatic dielectric liquid 16 has incorporated therein an epoxide compound comprising 1-epoxyethyl-3,4-epoxycyclohexane, having the following structural formula:

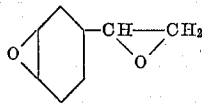

A commercially available epoxide compound of this composition is known as Unox Epoxide 206. This material is a liquid at ordinary temperatures, and has a molecular weight of 140 and a boiling point of 227° C. at 760 millimeters Hg pressure. For simplicity, this material will be referred to herein as EP–206 to mean the compound of the above structural formula whether obtained from the present commercial source or not.

It has been found in accordance with the invention that the EP–206 provides marked improvement in protecting electrical apparatus from the effects of decomposition products of the halogenated aryl compound used in the dielectric liquid. In particular, the EP–206 exhibits greatly increased speed of reaction with such decomposition products, notably hydrogen chloride, as compared to known scavenger compounds including epoxides such as phenoxypropylene oxide alone or even in combination with an accelerating catalyst such an amine, and is superior in this respect to tin tetraphenyl, a metallo-organic compound extensively used for such scavenging purposes.

Figure 4:
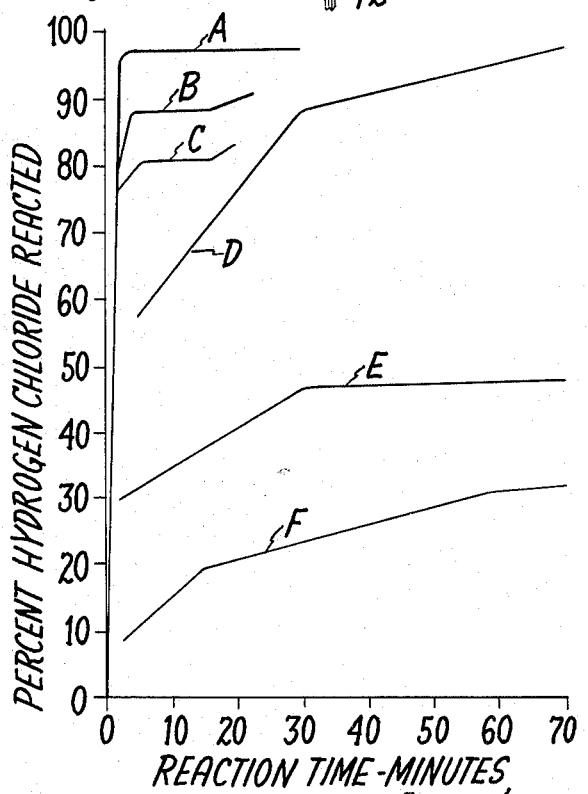
FIGURE 4 is a graphical showing of the reaction characteristics of the scavenger material of the present invention as compared to other scavenger materials.

FIGURE 4 is a graph showing the relative reaction rates with hydrogen chloride of a number of scavenger materials including the EP–206 of the present invention. In the graph, the percent hydrogen chloride reacted is plotted against reaction time in minutes at room temperature. The curves shown represent the different scavenger materials as follows, the scavengers being used in stoichiometric equivalent quantities, except for the EP–207 which was used in double the equivalent quantity and the tin tetraphenyl which was used in one-half the equivalent quantity due to lack of solubility of a greater quantity:

Curve A—1-epoxyethyl-3,4-epoxycyclohexane (EP–206)
Curve B—Phenoxypropylene oxide plus .02% tribenzylamine
Curve C—Dipentene dioxide (EP–269)
Curve D—Tin tetraphenyl
Curve E—Phenoxypropylene oxide
Curve F—Dicyclopentadiene dioxide (EP–207)

As is evident from the graph, the 1-epoxyethyl-3,4-epoxycyclohexane scavenger is considerably better than all the other scavengers in its speed of reaction with hydrogen chloride. Whereas it required at least 20 minutes for the next best scavenger (phenyoxypropylene oxide plus tribenzylamine) to react with 90% of the hydrogen chloride, the scavenger of the present invention had reacted with 95% of the hydrogen chloride within two minutes and 98% in about 5 minutes.

The following examples are illustrative of dielectric liquid compositions containing the 1-epoxyethyl-3,4-epoxycyclohexane scavenger which may be suitably used in electrical apparatus:

Example I

| | Parts by weight |
|---|---|
| Hexachlorodiphenyl | 45.0 |
| Trichlorobenzene | 40.0 |
| Tetrachlorobenzene | 15.0 |
| 1-epoxyethyl-3,4-epoxycyclohexane | 0.125 |

Example II

| | |
|---|---|
| Trichlorodiphenyl | 100.0 |
| 1-epoxyethyl-3,4-epoxycyclohexane | 0.3 |

Example III

| | |
|---|---|
| Pentachlorodiphenyl | 100.0 |
| 1-epoxyethyl-3,4-epoxycyclohexane | 0.3 |

The 1-epoxyethyl-3,4-epoxychyclohexane scavenger is readily soluble in halogen aromatic liquids, such as those mentioned above. The relative amount of scavenger compound present in compositions embodying this invention depends upon the nature of the electrical apparatus and the amount of stress or arcing to which the composition may be exposed in the ordinary use of the apparatus. Thus, the proportion of the scavenger compound in the dielectric may vary widely from trace amounts up to any desired proportion. As a practical matter, a range of scavenger content of .001% to about 10% by weight of the dielectric liquid would cover a wide variety of operating conditions, with a narrow range of the order of .05% to .50% being generally preferred for typical applications.

Comparative life tests were conducted on two groups of six capacitors each, wherein one group had a dielectric liquid of the composition of Example II above incorporated therein, while the other group, serving as a control, incorporated the same dielectric liquid without any epoxide stabilizer. The capacitors, rated at 3.7 μf and 330 v. A.C., were subjected to life test conditions of 85° C. and a voltage of 880 v. A.C. In this test it was found that all of the capacitors in the control group failed before 3000 hours with an average life of 1277 hours, whereas all the capacitors stabilized in accordance with the invention were still satisfactorily operating under the test conditions after 20,000 hours.

In additional life tests, one group of 10 capacitors having dielectric liquid stabilized with the epoxide scavenger of the invention withstood test conditions of 660 volts A.C. and 100° C. for over 1000 hours without failure, and another similar group of 10 capacitors withstood 880 volts A.C. and 85° C. without failure. In both cases, the percent power factor measured at 100° C. remained relatively stable at about .33% over the entire test period. The insulation resistance of similar capacitors subjected to life conditions of 880 volts A.C. and 85° C. was found to remain relatively stable at about 45 megohms over the 1000 hour test period, and this result was in marked contrast to a control group of capacitors which exhibited a marked drop from 60 megohms to 30 megohms over the life test period.

It is thus evident that the present invention provides remarkable improvement in life characteristics of capacitors in which it is embodied.

The accelerated removal of the decomposition products provided by the invention results not only in materially reduced corrosion of metal parts of the apparatus, but also in an advantageous reduction in harmful chemical effects of dissolved hydrogen chloride on paper or other cellulosic material present therein. In addition to such important advantages, further benefits are obtained due to the substantially lower cost of the 1-epoxyethyl-3,4-epoxycyclohexane as compared to other scavenger material heretofore used, such as phenoxypropylene oxide and tin tetraphenyl mentioned above, and the generally reduced amount of scavenger material which can be employed to obtain equivalent neutralization effects as compared to the known scavenger compounds.

The epoxide-containing composition herein described may find application for other than dielectric purposes, as for example for heat transfer media, and the invention thus includes within its scope such other uses broadly.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A dielectric composition comprising a chlorinated aromatic dielectric liquid containing .001–10% by weight of 1-epoxyethyl-3,4-epoxycyclohexane.

2. Electrical apparatus comprising in combination, a container, an electrical device in said container, and dielectric material in said container comprising a chlorinated aromatic dielectric fluid containing .001–10% by weight of 1-epoxyethyl-3,4-epoxycyclohexane.

3. An electrical capacitor comprising, in combination, a pair of electrodes separated by cellulosic dielectric material, and a dielectric liquid impregnating said dielectric material comprising a chlorinated aromatic compound containing dissolved therein as a scavenger .001 to 10% by weight of 1-epoxyethyl-3,4-epoxycyclohexane.

4. An electrical capacitor comprising, in combination, a pair of electrodes separated by films of dielectric material, at least one of said electrodes being in the form of a metallized coating on the dielectric material, and a dielectric liquid impregnating said dielectric material comprising a chlorinated aromatic compound containing dissolved therein as a scavenger .001–10% by weight of 1-epoxyethyl-3,4-epoxycyclohexane.

5. An electrical capacitor comprising, in combination, a pair of wound electrodes of metallic foil, said metallic foil electrodes being separated by dielectric spacer material, and a dielectric liquid impregnating said dielectric spacer material comprising a chlorinated aromatic compound containing dissolved therein as a scavenger .001–10% by weight of 1-epoxyethyl-3,4-epoxycyclohexane.

6. An electrical capacitor comprising, in combination, cooperating armatures and a dielectric liquid interposed between said armatures comprising trichlordiphenyl containing dissolved therein as a scavenger .001–10% by weight of 1-epoxyethyl-3,4-epoxycyclohexane.

7. An electrical capacitor comprising, in combination, cooperating armatures and a dielectric liquid interposed between said armatures comprising a chlorinated aromatic compound containing dissolved therein about .001–10% by weight as a scavenger of 1-epoxyethyl-3,4-epoxycyclohexane.

References Cited by the Examiner
UNITED STATES PATENTS 2,840,627  6/1958  Lewis _____ 252—66

FOREIGN PATENTS 418,230  10/1934  Great Britain.
601,359  5/1948  Great Britain.

OTHER REFERENCES

Peracetic Acid and Derivatives, published by Union Carbide Chemical Co., N.Y. 17, N.Y., 1957, page 38.

JOHN F. BURNS, *Primary Examiner.*